E. SCHMIDT.
BAKING FORM.
APPLICATION FILED JUNE 8, 1908.
922,050.
Patented May 18, 1909.
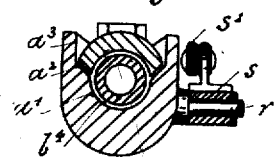
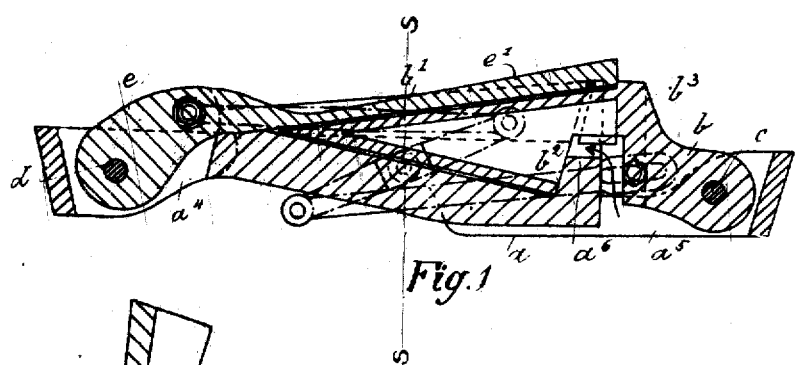
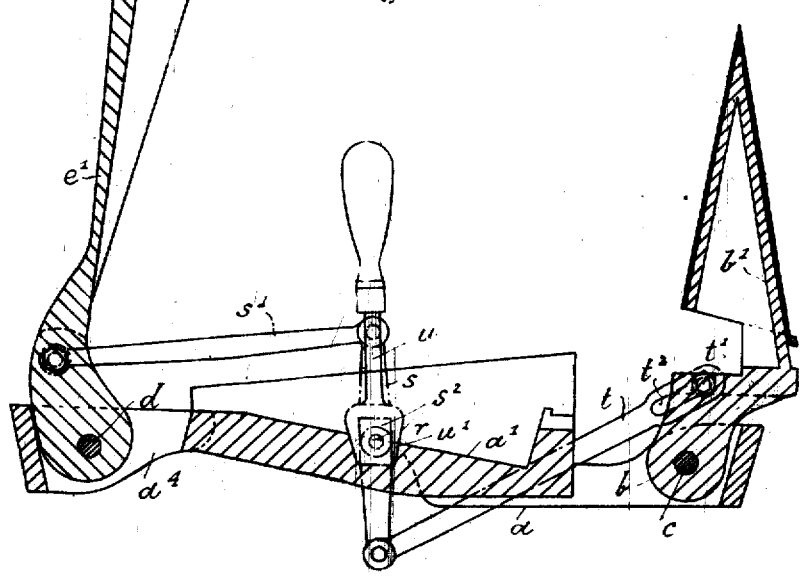

UNITED STATES PATENT OFFICE.

EMIL SCHMIDT, OF BARMEN, GERMANY.

BAKING-FORM.

No. 922,050.  Specification of Letters Patent.  Patented May 18, 1909.

Application filed June 8, 1908. Serial No. 437,440.

*To all whom it may concern:*

Be it known that I, EMIL SCHMIDT, residing in the city of Barmen, Rhenish Prussia, Germany, a subject of the Emperor of Germany, have invented a new and useful Improvement in Baking-Forms, of which the following is a specification.

My invention has reference to baking forms and especially to such forms by which a batch having the shape of a cone is baked from sweet dough and which is afterward filled with cream. So far as I am aware such cone has hitherto always been formed by hand from a plate of dough in a very hot state and such work requires much skill should there not be too much waste of dough. By means of my new device all these drawbacks are avoided and an unskilled person or a boy may easily handle the same.

In the accompanying drawing I have shown my new device by Figure 1 which is a longitudinal section thereof in a closed state, Fig. 2 which shows the device open, Fig. 3 which is a cross section on line $s$—$s$ of Fig. 1.

Referring to the said figures $a$ is a frame of a suitable material preferably of cast iron, which is provided with a half circular surface $a^1$ as seen from Fig. 3, which is of such length according to the batch to be made that on both ends of the frame $a$ there are the free channels $a^4$, $a^5$ left. This surface is at the same time conical and ends in a sharp point. From said surface $a^1$ extend on both sides the slanting portions $a^2$ which end in the upright flanges $a^3$. On one end of the frame $a$ and crossing the channel $a^5$ there is fastened a horizontal bolt $c$ which serves as a fulcrum for a piece $b$ which terminates in a cone $b^1$. Said cone is hollow as shown in Fig. 1 and fits into the surface $a^1$. At the end of $a^1$ there is an extended portion $a^6$ against the inner side of which bears the corresponding surface $b^2$ of cone $b^1$ and between said surface $b^2$ which is shaped in steps and the top of $a^6$ there is formed a groove $b^3$ by which heat is admitted to the interior of the cone $b^1$. The channel $a^5$ is occupied by a piece $e$ which is turnably located therein on a bolt $d$ and the said piece $e$ terminates in a lid $e^1$ being also conically shaped in such a manner, that it rests with its side flanges on the flanges $a^3$, surrounding together with the surface $a^1$ the hollow cone $b^1$ and forming around said cone a free space having the shape of a ring in cross section and a conical outer shape with a slanted base. Into this space $b^4$ the dough from which the baking is to be made is filled. For filling the dough into said space or channel $b^4$, the lid is first turned around its bolt $d$ and then the dough may be filled by means of a spoon, cup or the like and then the lid is laid down again and the device is put into a suitable baking oven where the heat can pass around it and enter the cone so that the dough may be perfectly baked. After the baking process is over the lid is lifted first, and then the cone is turned as shown in Fig. 2 whereupon the baking may be taken off.

The folding and unfolding of the device may be carried out simply by hand or by the means shown in the said figures and which means perform these operations in a more effective manner. For this purpose on one side of the frame $a$ is located turnably on a bolt $r$ a double armed lever $s$ one end of which is linked to a bar $s^1$ which is connected with the lid $e^1$. The other end of lever $s$ is combined with a bar $t$ and this bar has connection by a bolt $t^1$ and a slot $t^2$ with the cone piece $e$. The lever $s$ is further provided with a square $s^2$. By means of a suitable handle $u$ the mouth $u^1$ of which engages the square $s^2$ the lever $s$ is turned lifting first by means of rod $s^1$ the lid $e^1$ and afterward by the rod $t$ the cone $b^1$ and vice versa.

What I claim and desire to secure by Letters Patent is:

1. In a baking apparatus, the combination of a frame provided with a semiconical recess, vertical channels in each end of said frame, a hollow cone pivotally mounted in one of said channels and revoluble into said recess, a lid having a semiconical recess pivotally mounted in the other channel and adapted to rest on the frame in its closed position to form a conical chamber with the recess thereof.

2. In a baking apparatus, the combination of a frame provided with a semiconical recess, vertical channels in each end of said frame, a hollow cone pivotally mounted in one of said channels and revoluble into said recess, a lid having a semiconical recess pivotally mounted in the other channel and adapted to rest on the frame in its closed position to form a conical chamber with the recess thereof and means for simultaneously operating the hollow cone and the lid.

EMIL SCHMIDT. [L. S.]

Witnesses:
OTTO KÖNIG,
WM. WASHINGTON BRUNSWICK.